United States Patent
Ahmad et al.

(10) Patent No.: US 11,955,020 B2
(45) Date of Patent: Apr. 9, 2024

(54) SYSTEMS AND METHODS FOR OPERATING DRONE FLIGHTS OVER PUBLIC ROADWAYS

(71) Applicant: Ford Global Technologies, LLC, Dearborn, MI (US)

(72) Inventors: Syed Amaar Ahmad, Canton, MI (US); Krishna Bandi, Farmington Hills, MI (US); Richard Ortman, Saline, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 275 days.

(21) Appl. No.: 17/343,491

(22) Filed: Jun. 9, 2021

(65) Prior Publication Data

US 2022/0398932 A1    Dec. 15, 2022

(51) Int. Cl.
| | |
|---|---|
| G08G 5/00 | (2006.01) |
| B64C 39/02 | (2023.01) |
| H04W 4/40 | (2018.01) |
| H04W 4/90 | (2018.01) |

(52) U.S. Cl.
CPC ......... *G08G 5/0069* (2013.01); *B64C 39/024* (2013.01); *G08G 5/0013* (2013.01); *G08G 5/0056* (2013.01); *H04W 4/40* (2018.02); *H04W 4/90* (2018.02)

(58) Field of Classification Search
None
See application file for complete search history.

(56) References Cited

U.S. PATENT DOCUMENTS

| | | | |
|---|---|---|---|
| 9,646,283 B2 | 5/2017 | Kantor et al. | |
| 10,616,734 B1* | 4/2020 | Lekutai | H04W 4/027 |
| 10,678,267 B2 | 6/2020 | Ham et al. | |

(Continued)

FOREIGN PATENT DOCUMENTS

| | | |
|---|---|---|
| KR | 20170080354 A | 7/2017 |
| WO | 2020205597 A1 | 10/2020 |

OTHER PUBLICATIONS

Abbas Yazdinejad et al, "Enabling Drones in the Internet of Things with Decentralized Blockchain-Based Security", IEEE Internet of Things Journal, 2020, 10 pages.

(Continued)

*Primary Examiner* — Christian Chace
*Assistant Examiner* — Shayne M. Gilbertson
(74) *Attorney, Agent, or Firm* — Brandon Hicks; Eversheds Sutherland (US) LLP

(57) ABSTRACT

Systems and methods for operating done flights over public roadways are disclosed herein. An example method includes transmitting, by a first drone, a drone safety message, the drone safety message being received by a vehicle or a roadside infrastructure device located along a first planned flight path, determining an emergency condition for the first done, transmitting a warning message over a vehicle-to-everything communication that indicates that the first drone is experiencing the emergency condition. A connected vehicle or mobile device receives the warning message over the vehicle-to-everything communication. Determining drone operating evidence as the first drone traverses along the first planned flight path, and storing the drone operating evidence in a distributed ledger.

9 Claims, 5 Drawing Sheets

(56) References Cited

U.S. PATENT DOCUMENTS

| | | | |
|---|---|---|---|
| 11,259,195 B1* | 2/2022 | Nevdahs | H04W 40/22 |
| 2004/0148065 A1* | 7/2004 | Andrews | G08G 5/0082 |
| | | | 701/3 |
| 2016/0042637 A1 | 2/2016 | Cahill | |
| 2016/0093124 A1* | 3/2016 | Shi | B64C 39/024 |
| | | | 701/2 |
| 2017/0004714 A1* | 1/2017 | Rhee | G08G 5/0056 |
| 2018/0357909 A1* | 12/2018 | Eyhorn | G08G 5/0039 |
| 2019/0052349 A1* | 2/2019 | Russell | H04B 7/18506 |
| 2019/0392716 A1* | 12/2019 | Lu | H04W 4/024 |
| 2020/0066142 A1* | 2/2020 | Fowe | G06V 20/182 |
| 2020/0193729 A1* | 6/2020 | Nilsson | G08B 13/1965 |
| 2020/0258400 A1* | 8/2020 | Yuan | G06F 18/2413 |
| 2020/0320888 A1* | 10/2020 | Hall | G08G 5/025 |
| 2021/0256255 A1* | 8/2021 | Al Qizwini | G06N 3/08 |
| 2022/0365167 A1* | 11/2022 | Zhang | H04W 4/40 |
| 2022/0392353 A1* | 12/2022 | Contreras | G05D 1/106 |

OTHER PUBLICATIONS

Fatma Outay et al, "Applications of Unmanned Aerial Vehicle (Uav) in Road Safety, Traffic and Highway Infrastructure Management: Recent Advances and Challenges", Elsevier Ltd. Transportation Research Part A, 2020, 14 pages.

\* cited by examiner

SYSTEMS AND METHODS FOR OPERATING DRONE FLIGHTS OVER PUBLIC ROADWAYS

BACKGROUND

Drone use is becoming more prevalent for tasks such as package delivery. Currently, the federal aviation administration (FAA) and other government bodies do not permit drone operation over public roadways or where humans are present. For example, given the short battery duration of most drones there is the potential that a drone may run out of power and fall to the ground near pedestrians and vehicles. More so, adverse effects of weather on battery life, the presence of trees or buildings, and the potential collision with other flying objects (e.g., birds, aircraft, or other drones) add to the potential risk that the drone may fall to the ground near pedestrians and vehicles.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
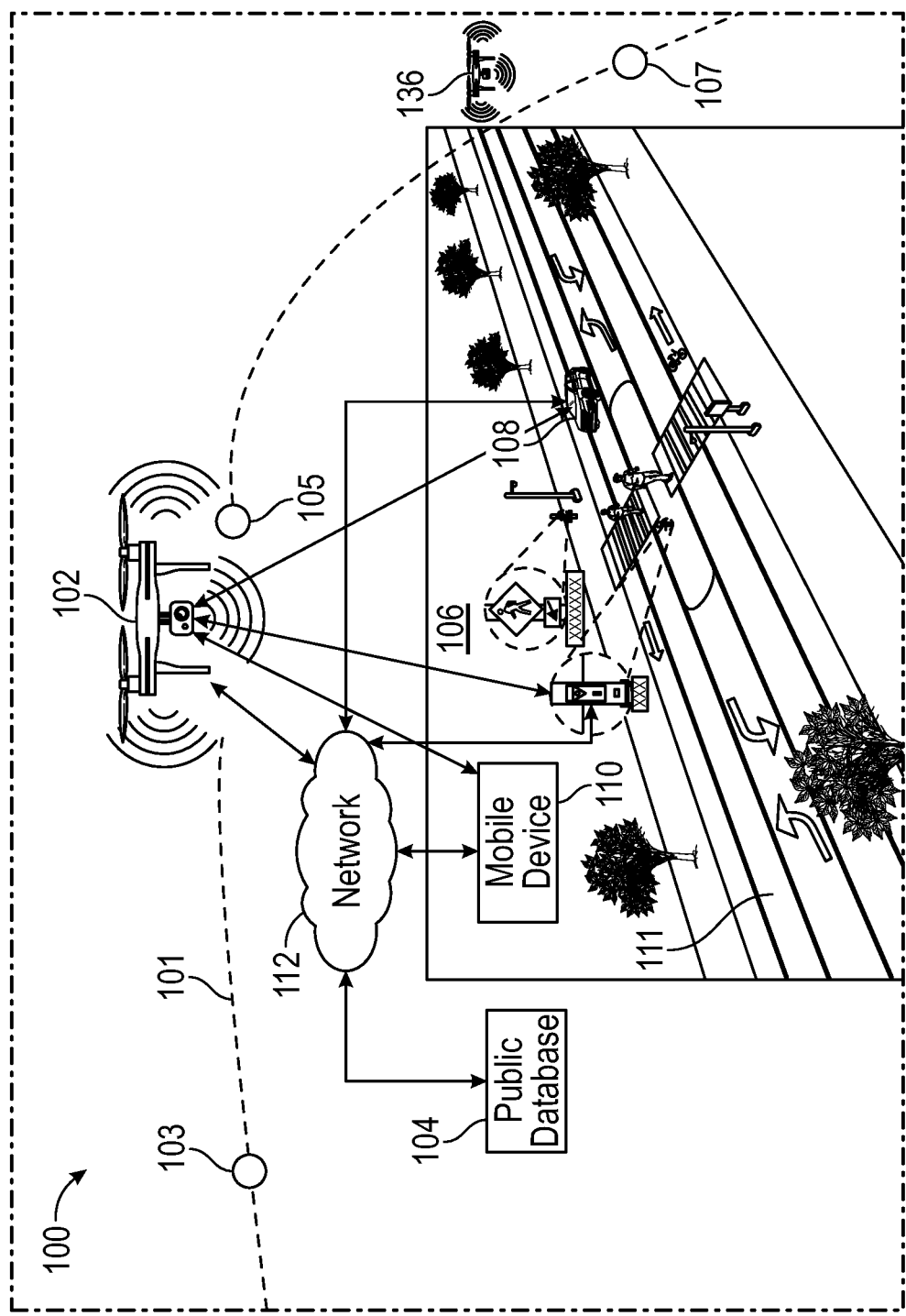
FIG. 1 illustrates an example architecture where the systems and method of the present disclosure may be practiced.

The present disclosure is directed to systems and methods for ensuring safe drone flights over public roadways or other restricted/sensitive locations. As used herein roadways may include walkways and the like. A drone equipped with an example system of the present disclosure may broadcast its current position, mobility dynamics, and planned flight path using vehicle-to-everything (V2X) safety messages. This information can be used by nearby vehicles or pedestrians to alert them of the presence of the drone. Likewise, other drones can also use this information to adjust or alter flight paths to avoid a potential crash trajectory if or when a convergence of flight paths is detected. An example drone may also use the transmission of safety messages by V2X-capable vehicles and may use received signal strength (RSSI) of Bluetooth/Wi-Fi/Cellular transmissions from mobile devices to detect proximity to humans and therefore roadways. Another proximity detection method can be based on alternate radio location techniques, such as ranging with UWB. Based on these signals, the drone may then alter its flight path to temporarily avoid public roadways, particularly when vehicles and/or mobile device associated with humans are present on the roadways and/or walkways.

When the drone needs to fly over a public road, the drone may obtain video footage of the area directly beneath the drone as proof that the drone was not traveling over the roadway with pedestrians or vehicles in the area. This video can be made available in case of an accident for liability resolution. The drone may only take the video footage while crossing the roadway or walkway. In some examples, the drone can continuously record drone operational evidence during flight, regardless of the context. When executing maneuvers such as crossing roadways or walkways, making emergency landings, or other drone operations, the drone can collect and store drone operating evidence such as video or drone operating parameters. This drone operating evidence may be uploaded to a distributed digital ledger for immutable protection of the video and other data related to flight path/safety/encounters and to provide proof that no disallowed maneuver was ever taken by the drone. The use of a digital distributed ledger will ensure that there is non-repudiable proof of safety in its flight maneuvers.

The drone may publish its intended flight path over public roadways and walkways to a public database before the flight, allowing pedestrians and vehicles to download information to be aware of the time and place of the potential of risk. The source and destination address of the drone and its identity or payload shall remain anonymous. V2X infrastructure Roadside Units (RSUs) that download drone flight paths public road space database can support relaying of drone flight information to surrounding vehicles and pedestrians when the drone is in proximity. Additionally, the drone may broadcast its intended flight path via V2X broadcast messages that can be received by V2X enabled components. Thus, while the intended flight path can be pre-published, it can also be transmitted in real-time or near-real-time using V2X broadcast messages. Thus, V2X enabled components such as a vehicle or a mobile device that does not have access to the published flight path can be apprised of the position of the drone. Also, real-time transmission of flight path data allows for communication of deviations in flight path due to unexpected, miscellaneous factors.

If a drone is running out of battery or is otherwise losing control, the drone can add emergency information to its broadcast messages in any available wireless technology (V2X, Bluetooth, Wi-Fi, or cellular) to alert others of the danger. V2X infrastructure roadside units (RSUs) that download drone flight paths over public roads and walkways can support relaying of drone flight information to surrounding vehicles and pedestrians when the drone is in proximity.

Illustrative Embodiments

Turning now to the drawings, FIG. 1 depicts an illustrative architecture 100 in which techniques and structures of the present disclosure may be implemented. The architecture 100 includes a drone 102, a public database 104 (e.g., one or more computers/servers), a roadside infrastructure device 106, a connected vehicle 108, a mobile device 110, and a network 112.

Some or all of these components in the architecture 100 can communicate with one another using the network 112. Some or all of these components in the architecture 100 can communicate directly with one another via various wireless protocols and/or via the network 112. The network 112 can include combinations of networks that enable the components in the architecture 100 to communicate with one another. The network 112 may include any one or a combination of multiple different types of networks, such as cellular, cable, the Internet, wireless networks, and other private and/or public networks. In some instances, the network 112 may include Wi-Fi or Wi-Fi direct. The network 112 can include short-range or radiofrequency links such as BLUETOOTH or ultra-wideband (UWB).

The drone 102 can be configured to operate along a planned flight path 101. The flight path may include waypoints between an origin and a destination. For example, the flight path can include waypoints 103, 105, and 107. In this example, the waypoint 103 has been passed, the waypoint 105 is where the drone is currently positioned, and the final waypoint 107 is where the drone 102 is heading (e.g., anticipated flight path). This planned flight path 101 may be determined prior to launching the drone and may be transmitted to the public database 104 prior to launch. Also, the drone 102 can track its actual flight path and report the same to the public database 104, as a part of a drone operating evidence reporting process, as will be discussed in greater detail herein. It will be understood that the planned flight path may include waypoints that extend over public roadways. However, some waypoints may take the drone over non-public; or non-pedestrian areas. The drone 102 may be configured not to show these non-public or non-pedestrian areas to maintain anonymity. These non-public or on-pedestrian areas can also be illustrated on the planned flight path in some instances. For example, when publishing the planned flight path 101, the waypoint 103 could be omitted because it is indicative of a location that is associated with anon-public or non-pedestrian area As noted above, some flight paths can be created to avoid public roadways, such as roadway 111. However, it may not be possible to avoid all public roadways. Thus, in this example, the planned flight path includes the waypoint 105 that is above or near a public roadway 111 where the connected vehicle 108 may operate. Also, pedestrians may utilize a crosswalk of the public roadway 111. One or more of the pedestrians may have a mobile device, such as the mobile device 110. The roadside infrastructure device 106 can include a stoplight, streetlight, or other infrastructure element. V2X enabled infrastructure roadside units (RSUs) may download drone flight paths from a public road space database. These RSUs can support relaying drone flight information to surrounding vehicles and pedestrians when the drone is in proximity thereto.

Figure 2:
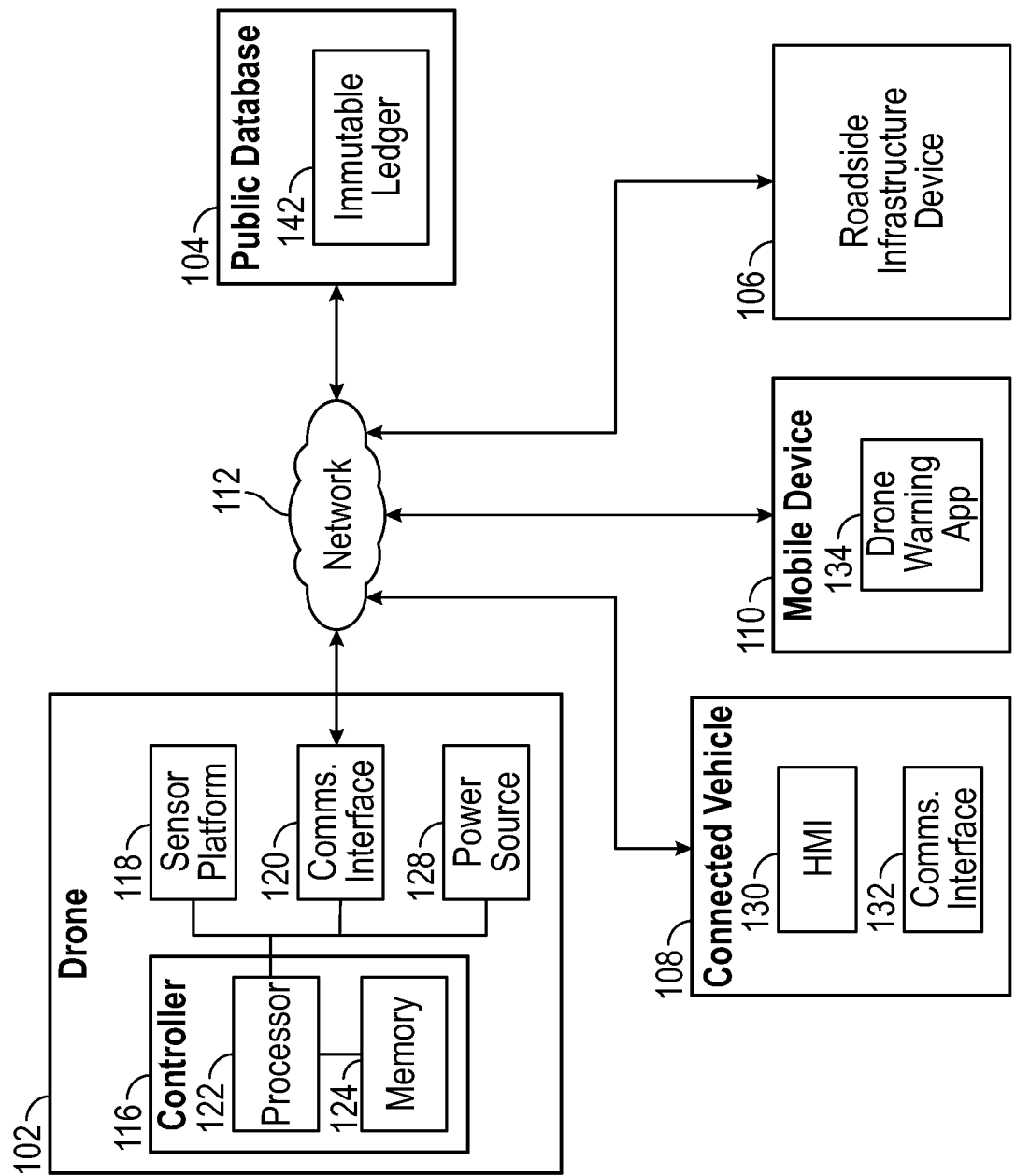
FIG. 2 is a schematic diagram of components of the architecture of FIG. 1.

Referring now to FIGS. 1 and 2, the drone 102 may comprise a controller 116, a sensor platform 118, and a communications interface 120. The controller 116 may comprise a processor 122 and memory 124 for storing instructions. The processor 122 executes instructions stored in memory 124 to perform any of the methods disclosed herein. When referring to actions performed by the controller 116 or drone 102, this implicitly involves the execution of instructions by the processor 122. In one example, memory 124 can store and execute flight control logic and/or image processing logic.

It will further be understood that while not necessarily illustrated, each component of the architecture such as the roadside infrastructure device 106, the connected vehicle 108, and the mobile device 110 can be equipped with one or more processors and one or more memories for storing instructions that allow the respective component to perform actions disclosed herein. Further, each of the components can include hardware for accessing the network 112.

The controller 116 can be configured to predetermine a flight plan prior to departure from its origin. The controller 116 can utilize satellite maps or other similar information to plan and evaluate a route between the origin and a destination. The controller 116 can determine waypoints along the route. These waypoints can include arbitrary locations along the flight path, but can also include specific points of interest such as cities, buildings, roadways, and as well as other locations where connected vehicles or pedestrians may be present. As noted above, the flight path can be transmitted for storage in the public database. The flight path can also be disseminated directly to the connected vehicle 108 and/or the mobile device 110. In some instances, the flight path may be transmitted to the roadside infrastructure device 106. The roadside infrastructure device 106 can push the flight path information to the connected vehicle 108 and/or the mobile device 110, when the connected vehicle 108 and/or the mobile device 110 are in communication with the roadside infrastructure device 106.

In some instances, the predetermined flight plan can be transmitted as V2X safety messages. To be sure, other protocols can be used. The V2X safety messages can be transmitted over both long and/or short-range wireless links. As will be discussed in greater detail with respect to FIG. 3, the drone 102 can interact with the connected vehicle 108 and/or the mobile device 110 over the short-range wireless connection in certain scenarios. As the drone 102 flies, it broadcasts a drone safety message that includes the drone's current position, its mobility dynamics, and its anticipated flight path. Again, the drone 102 may deviate from its predetermined flight plan, and this reporting the current location and anticipated flight path may allow vehicles/individuals in the anticipated flight path to determine that they may encounter the drone 102. Thus, the drone 102 can have a predetermined or planned flight path. Any change or deviation in this predetermined or planned flight path may involve the drone 102 transmitting or otherwise sharing a new, anticipated flight path.

The drone 102 can also comprise a power source 128 such as a battery. As noted above, unexpected meteorological events, such as wind, rain, hail and the like may affect drone performance. For example, if a drone 102 encounters strong headwinds, the drone 102 may utilize more energy from its battery than expected. Thus, the drone 102 may lose power during flight. Other scenarios can also result in the loss of power. Any number of failure events can be experienced by the drone 102. When the controller 116 determines that a failure scenario event is occurring, the controller 116 can broadcast a warning message to the network 112 to indicate that a failure event is occurring. When the drone 102 is determined to be over a public roadway or otherwise above a connected vehicle and/or a human, the drone 102 can also transmit this warning message over a short-range connection such as BLUETOOTH or UWB. In some instances, the warning messages are transmitted over a short-range connection regardless of whether objects are located below the drone or not.

The connected vehicle 108 includes at least a human-machine interface (HMI 130) such as an infotainment system. The connected vehicle may also include one or more processors and memory for controlling various aspects of the vehicle and subcomponents of the vehicle. The HMI 130 can display drone flight path information, as well as drone warning messages as disclosed herein. The connected vehicle 108 may comprise a communications interface 132 that allows the connected vehicle 108 to transmit and/or receive data over the network 112. The communications interface 132 can also enable V2X communications with the drone 102 and/or the roadside infrastructure device 106.

The mobile device 110 may also include one or more processors and memory for controlling various aspects of the mobile device. For example, the mobile device 110 can store and execute a drone warning application 134 to allow the mobile device 110 to receive drone flight path information, as well as drone warning messages over a short-range wireless link. The mobile device 110 can also indirectly receive drone flight path and/or warning messages from the roadside infrastructure device 106. The drone warning application 134 can download and display drone flight path information stored in the public database 104. In some instances, the drone warning application 134 automatically downloads and displays a drone flight path from the public database 104 based on the current location of the mobile device 110. The mobile device 110 includes native location determining hardware, such as global positioning system hardware.

In addition to the drone 102, there may be other drones operating in areas that coincide with the flight path of the drone 102. Thus, other drones may also receive the drone's flight path information from the public database 104, from the roadside infrastructure device 106, or other components of the architecture 100. The drone 102 can also transmit data directly to a second drone 136. For example, the second drone 136 may operate in an area near the waypoint 107. In this example, the second drone 136 can obtain the flight path of the drone 102. The second drone 136 can evaluate the flight path and determine that it may be on a collision course with the drone 102 based on its current flight path. The second dome 136 can adjust its flight path to avoid the area around the waypoint 107. In another example, if the second drone 136 cannot avoid the waypoint 107, the second drone 136 can transmit a signal to the drone 102 to adjust its flight path to prevent a collision. For example, the drone 102 can be instructed to pause mid-air for a period of time to ensure that the second drone 136 has passed the waypoint 107 before the drone 102 encounters the waypoint 107.

Figure 3:
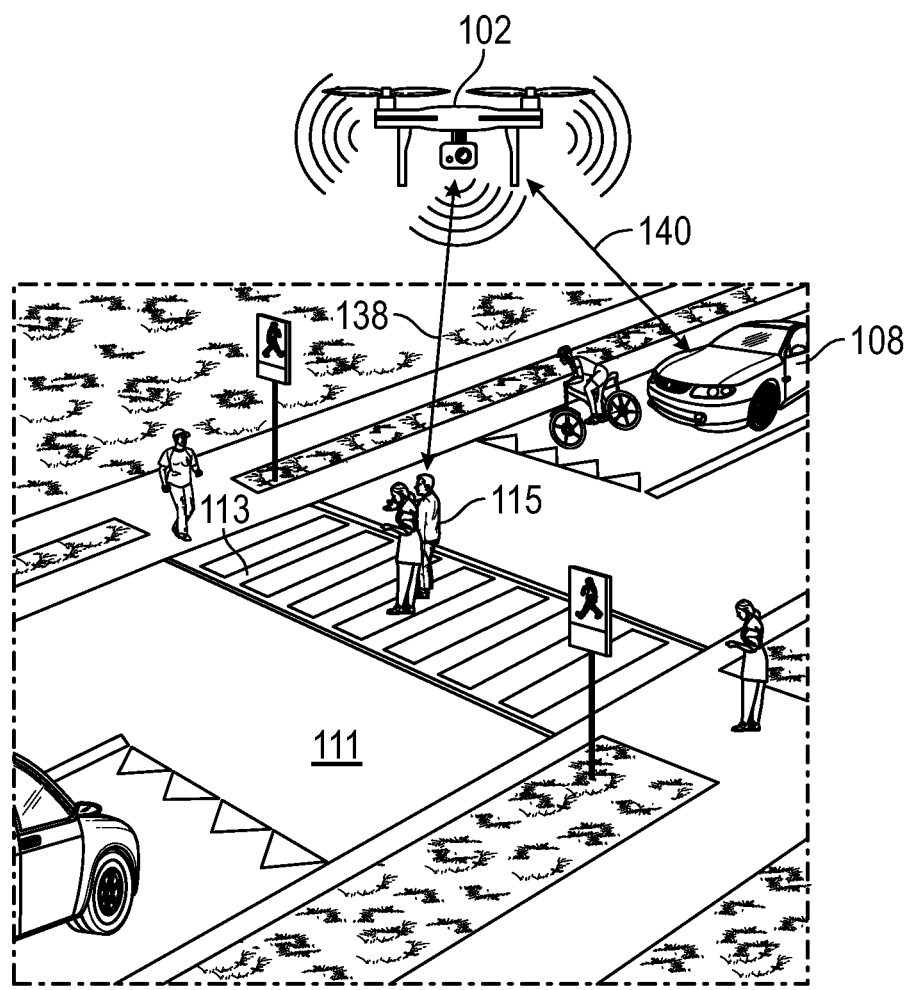
FIG. 3 is a perspective view of an example scenario for a drone operating over a public roadway.

In FIG. 3, the drone 102 may determine that it is located over human beings, vehicles, or a public roadway. As noted above, despite creating a flight plan that avoids the drone passing over public roadways, the drone 102 may wander off its flight plan based on any number of factors.

In some instances, the drone 102 may be required to fly over a public road, the drone may obtain take video footage of the area directly beneath it as proof that it did not do so when pedestrians or vehicles were present in that area. This video can be made available in case of an accident for liability resolution by storage in the public database 104 and/or the immutable ledger 142. The immutable ledger 142 can be stored in the public database or by a service provider. Further, other elements in the environment such as vehicles or mobile devices within proximity of the drone may be notified of the upload to the ledger. That is, updating of the ledger can be a trigger that causes notifications to elements in the broadcast area.

In these instances, the drone 102 may periodically identify when it may be above humans, vehicles, or locations where humans are likely to be located. The drone 102 can take evasive maneuvers in some instances when it finds itself unexpectedly over humans, vehicles, or locations where humans are likely to be located.

In this example, the public roadway 111 includes a crosswalk 113. Individuals 115 are crossing the public roadway 111 using the crosswalk 113. Cars, such as connected vehicle 108 are stopped to allow the individuals to cross. In this example, the drone 102 may or may not have determined that it was approaching the roadway 111. Thus, the drone 102 can utilize short-range wireless communication to detect mobile devices associated with the individuals 115. For example, the controller 116 of the drone 102 can receive signals from a mobile device using the communications interface 120 of the drone 102 over short-range link 138. When an RSSI of the signal from the mobile device is at or above a threshold RSSI value, the controller 116 determines that it is above a human. The controller 116 can then switch on a camera (if the camera is not active) to obtain the images below. The controller 116 can be configured to adjust the travel path of the drone 102 to avoid pedestrians/vehicles. Signals can also be received from the connected vehicle 108 on short-range link 140. The controller 116 may likewise wait until the public roadway 111 is of vehicles and/or individuals before proceeding. In sum, the controller 116 can receive vehicle safety messages from V2X-capable vehicles, as well as RSSI of BLUETOOTH/Wi-Fi/cellular transmissions of pedestrian mobile devices to detect proximity to these objects and then alter the drone's flight path to avoid public roadways.

Figure 4:
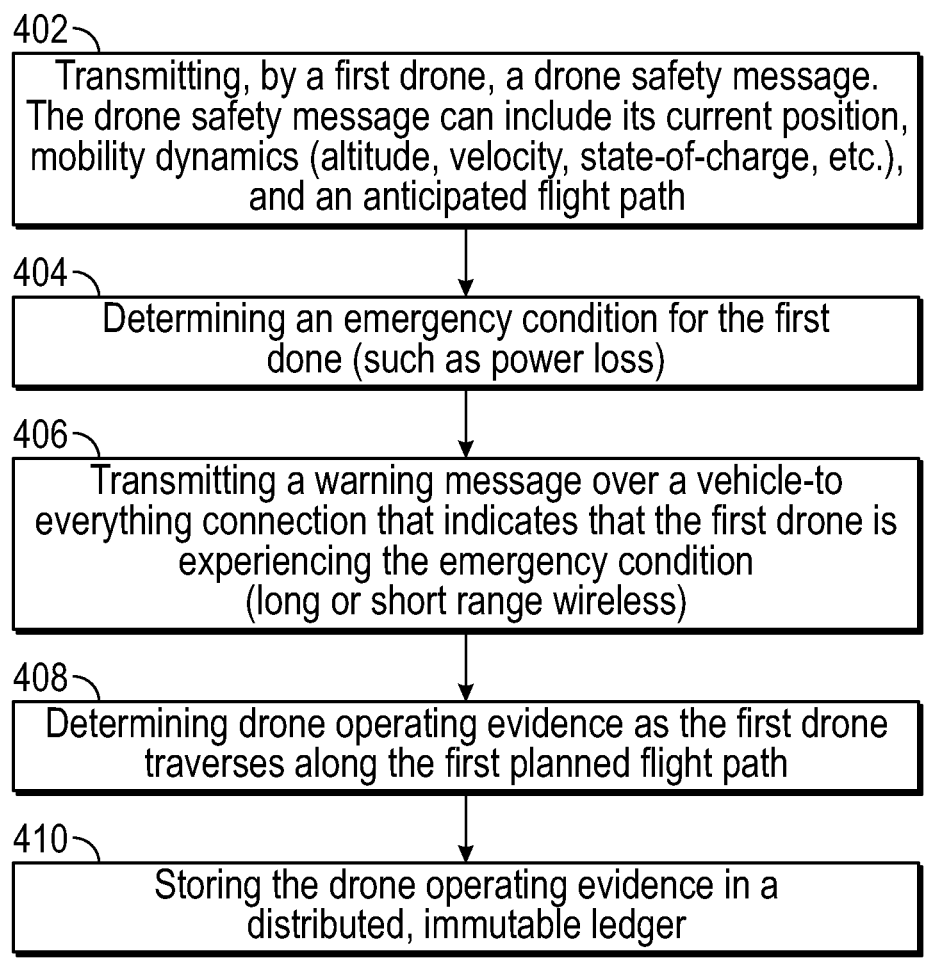
FIG. 4 is a flowchart of an example method of the present disclosure.

FIG. 4 is a flowchart of an example method. The method can include a step 402 of transmitting, by a first drone, a drone safety message. The drone safety message can include its current position, mobility dynamics (altitude, velocity, state-of-charge, etc.), and an anticipated flight path. Again, the anticipated flight path may or may not coincide with the predetermined flight path that was initially planned.

As noted above, the drone safety message can be received by a vehicle or a roadside infrastructure device located along a first planned flight path. The safety message can be transmitted using V2X protocols. The drone safety message can be transmitted to roadside infrastructure devices along the flight path. The flight path can also be made available to vehicles and individuals by publishing the flight path to a public database.

As the drone is flying, the drone may encounter an emergency condition, such as the primary battery of the drone losing power. Thus, the method can include a step 404 of determining an emergency condition for the first done. While the loss of battery charge is an example, emergency condition, any emergency condition that may result in the drone having to make an unexpected landing may be considered an emergency condition as well.

The method can include a step 406 of transmitting a warning message over a vehicle-to-everything communication that indicates that the first drone is experiencing the emergency condition. The V2X connection can be a long-range wireless connection and/or a short-range wireless connection in some instances.

The method can also include a step 408 of determining drone operating evidence as the first drone traverses along the first planned flight path. For example, the drone can switch on a camera to obtain images/video for the entire duration of the drone flight. In some instances, the camera can be turned on when an emergency condition occurs. In yet other instances, the drone can activate its camera when approaching and/or crossing a public roadway. The drone can retain this image/video evidence to prove that it did not fly over vehicles or a human as it traversed over the roadway. Next, the method can include a step 410 of storing the drone operating evidence in a distributed, immutable ledger. This can include a blockchain ledger stored at a service provider.

The method can also include a step of forwarding the drone safety message by the roadside infrastructure device to a connected vehicle or user device that is within range of the roadside infrastructure device. In some instances, the roadside infrastructure device transmits the current position and the mobility dynamics when the first drone is unable to transmit the drone safety message.

Figure 5:
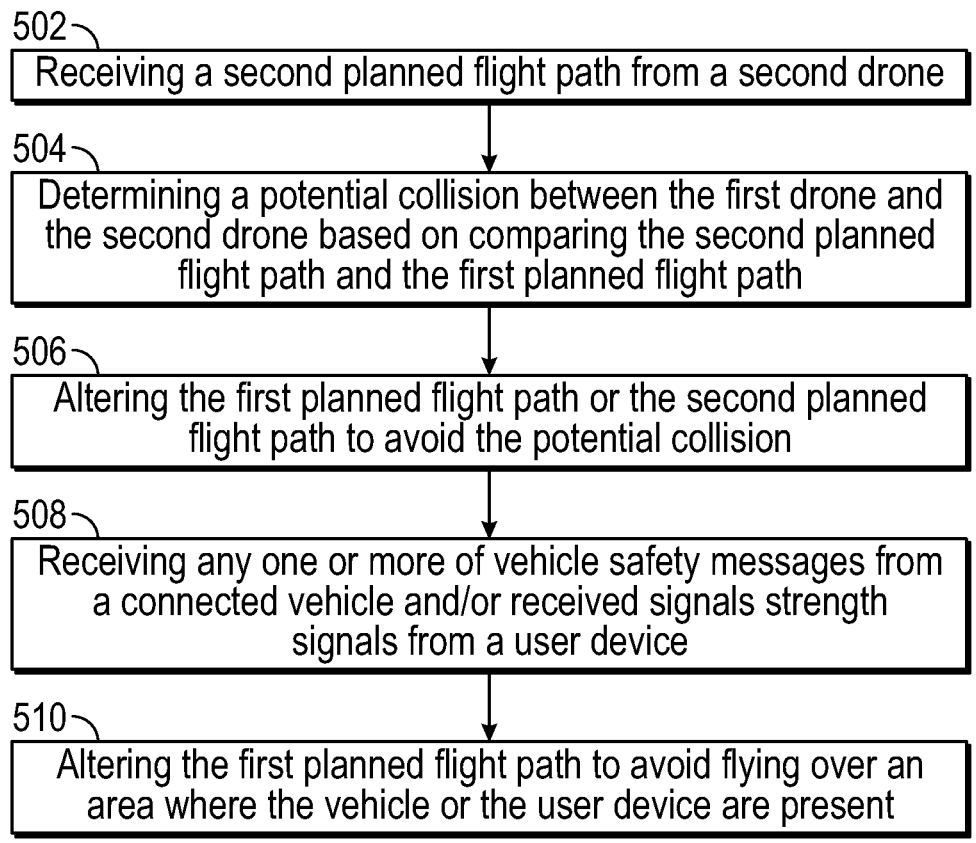
FIG. 5 is a flowchart of another example method of the present disclosure.

FIG. 5 is a flowchart of an example method for preventing drone to drone collision. The method can include a step 502 of receiving a second planned flight path from a second drone. For example, more than one drone of the present disclosure can transmit its predetermined and/or actual flight path to other drones. This can include pre-publishing the flight path prior to the flight and/or broadcasting the actual flight path during flight.

Next, the method can include a step 504 of determining a potential collision between the first drone and the second drone based on comparing the second planned flight path and the first planned flight path. In some instances, this can include determining when two drones may pass within a predetermined distance from one another. When a potential collision is detected, the method can include a step 506 of altering the first planned flight path or the second planned flight path to avoid the potential collision.

The method may also include in-flight determinations of when the drone may be inadvertently over roadways and/or humans. The method may include a step 508 of receiving any one or more of vehicle safety messages from a connected vehicle and/or received signals strength signals from a user device. Next, the method includes a step 510 of altering the first planned flight path to avoid flying over an area where the vehicle or the user device is present. This can include a deviation of course away from the roadway. In other examples, the drone can hover and wait for cars and humans to clear the roadway prior to the drone crossing.

Figure 6:
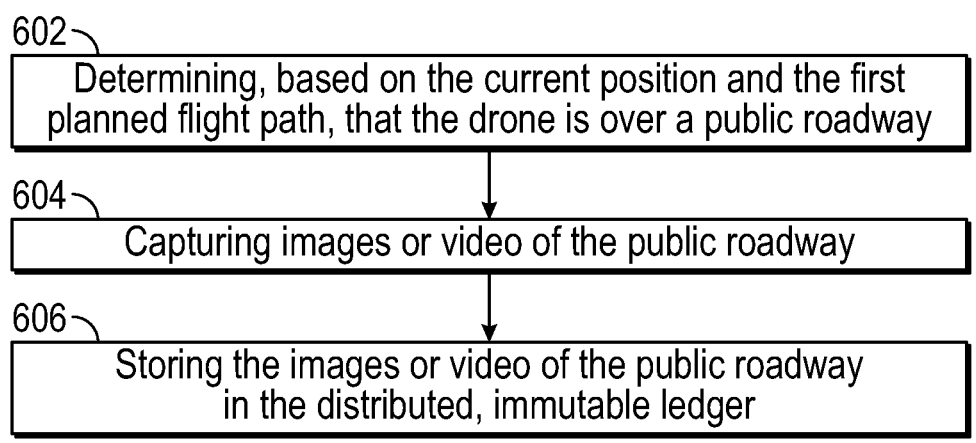
FIG. 6 is a flowchart of yet another example method of the present disclosure.

FIG. 6 is a flowchart of an example method of determining drone operating evidence, which can include a step 602 of determining, based on the current position and the first planned flight path, that the drone is over a public roadway. The method can include a step 604 of determining if or when vehicles and/or humans are present on the roadway. When no vehicles or humans are present, the method can further include a step 604 capturing images or video of the public roadway. This evidence confirms that the drone did not cross the road when vehicles or humans were present. The method can include a step 606 of storing the images or video of the public roadway in the distributed, immutable ledger.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:
1. A method comprising:
   determining, by a first drone, a drone safety message, wherein the drone safety message is transmitted over a vehicle-to-everything communication and received by a connected vehicle located along a first planned flight path;
   transmitting the first planned flight path to a public database for publishing in a manner wherein at least one waypoint along the first planned flight path is omitted because it is indicative of a location that is associated with a non-public or non-pedestrian area, thereby allowing the first drone to maintain anonymity when transmitting the first planned flight path;
   determining an emergency condition for the first drone;
   transmitting a warning message over the vehicle-to-everything communication that indicates that the first drone is experiencing the emergency condition,
   receiving the drone safety message via the vehicle-to-everything communication at an infrastructure roadside unit (RSU), wherein the RSU is a stoplight or a streetlight;
   relaying the drone safety message from the RSU to the connected vehicle and a mobile device of a pedestrian when the first drone is within a predetermined distance of the RSU, thereby allowing the connected vehicle and the mobile device to be apprised of a current position of the first drone, even when the mobile device does not have access to the published first planned flight path;
   determining a proximity of the first drone to the pedestrian based on a transmission sent from the mobile device to the first drone; determining drone operating evidence as the first drone traverses along the first planned flight path;
   storing the drone operating evidence in a distributed ledger, wherein the drone safety message comprises any one or more of the current position, mobility dynamics, and/or the first planned flight path for the first drone, receiving vehicle safety messages from the connected vehicle; and altering the first planned flight path to avoid flying over an area where the connected vehicle is present such that the first drone hovers and waits for the connected vehicle to clear a public roadway before crossing the public roadway;

wherein determining the drone operating evidence comprises:

determining, based on the current position and the first planned flight path, that the first drone is near the public roadway, turning on a camera of the first drone responsive to the emergency condition occurring, capturing images or video of the public roadway with the camera, and storing the images or video of the public roadway in the distributed ledger in order to prove that the first drone did not fly over the connected vehicle as it traversed the public roadway.

2. The method according to claim 1, further comprising:
receiving a second planned flight path from a second drone at the RSU;
  determining a potential collision between the first drone and the second drone based on comparing the second planned flight path and the first planned flight path; and
  relaying the determination of the potential collision from the RSU to the first drone and the second drone in order to alter the first planned flight path or the second planned flight path to avoid the potential collision.

3. The method according to claim 1, wherein the emergency condition comprises a power source of the first drone failing, and wherein transmitting the warning message over the vehicle-to-everything communication comprises transmitting the warning message over a short-range connection comprising ultra-wideband (UWB) responsive to determining that the first drone is above the public roadway, the connected vehicle, and/or the pedestrian.

4. A drone comprising:
a processor; and
a memory for storing instructions, the processor executing the instructions to:
transmit a drone safety message over a vehicle-to-everything communication, the drone safety message being received by a connected vehicle located along a first planned flight path;
transmit the first planned flight path to a public database for publishing in a manner wherein at least one waypoint along the first planned flight path is omitted because it is indicative of a location that is associated with a non-public or non-pedestrian area, thereby allowing the drone to maintain anonymity when transmitting the first planned flight path;
determine that the drone is experiencing an emergency condition and may unexpectedly land;
transmit a warning message over the vehicle-to-everything communication that indicates that the drone is experiencing the emergency condition;
receive the drone safety message via the vehicle-to-everything communication at an infrastructure roadside unit (RSU), wherein the RSU is a stoplight or a streetlight;
relay the drone safety message from the RSU to the connected vehicle and a mobile device of a pedestrian when the first drone is within a predetermined distance of the RSU, thereby allowing the connected vehicle and the mobile device to be apprised of a current position of the drone, even when the mobile device does not have access to the published first planned flight path;
determine a proximity of the drone to the pedestrian based on a transmission sent from the mobile device to the drone;
determine drone operating evidence as the drone travels along the first planned flight path; store the drone operating evidence in a distributed ledger, wherein the drone safety message comprises any one or more the current position, mobility dynamics, and/or the first planned flight path for the drone; and
alter the first planned flight path to avoid flying over an area where the connected vehicle is present such that the drone hovers and waits for the connected vehicle to clear a public roadway before crossing the public roadway;
wherein determining the drone operating evidence comprises:
determine, based on the current position and the first planned flight path, that the drone is near the public roadway,
turn on a camera of the drone responsive to the emergency condition occurring,
capture images or video of the public roadway, and
store the images or video of the public roadway in the distributed ledger in order to prove that the drone did not fly over the connected vehicle as it traversed the public roadway.

5. The drone according to claim 4, wherein the processor is configured to:
receive a second planned flight path from a second drone at the RSU;
determine a potential collision between the drone and the second drone based on comparing the second planned flight path and the first planned flight path; and
relay the determination of the potential collision from the RSU to the first drone and the second drone in order to alter the first planned flight path or the second planned flight path to avoid the potential collision.

6. A method comprising:
determining a planned flight path for a drone;
transmitting the planned flight path to a public database for publishing in a manner wherein at least one waypoint along the planned flight path is omitted because it is indicative of a location that is associated with a non-public or non-pedestrian area, thereby allowing the drone to maintain anonymity when transmitting the planned flight path;
transmitting the planned flight path in a drone safety message to an infrastructure roadside unit (RSU), wherein the RSU is a stoplight or a streetlight;
relaying the drone safety message from the RSU to a first connected vehicle and a mobile device of a pedestrian when the drone is within a predetermined distance of the RSU, thereby allowing the first connected vehicle and the mobile device to be apprised of a current position of the drone, even when the mobile device does not have access to the published planned flight path;
determining a proximity of the drone to the pedestrian based on a transmission sent from the mobile device to the drone;

determining, based on the current position of the drone and the planned flight path, that the drone is over a public roadway;

receiving vehicle safety messages from the first connected vehicle;

altering the planned flight path to avoid flying over an area where the first connected vehicle is present such that the drone hovers and waits for the first connected vehicle to clear the public roadway before crossing the public roadway;

responsive to determining that an emergency condition for the drone is occurring, turning on a camera of the drone to capture images or video of the public roadway as the drone passes near the public roadway; and storing the images or video of the public roadway in a distributed ledger as drone operating evidence as proof that the first connected vehicle was not under the drone as it passed over the public roadway.

7. The method according to claim 6, further comprising:
receiving a second planned flight path from a second drone at the RSU;

determining a potential collision between the drone and the second drone based on comparing the second planned flight path and the planned flight path; and relaying the determination of the potential collision from the RSU to the first drone and the second drone in order to alter the planned flight path or the second planned flight path to avoid the potential collision.

8. The method according to claim 6, wherein the drone safety message comprises any one or more of the current position, mobility dynamics, and/or the planned flight path for the drone.

9. The method according to claim 1, wherein transmitting the warning message over the vehicle-to-everything communication comprises transmitting the warning message over a short-range connection comprising ultra-wideband (UWB) responsive to determining that the first drone is above the public roadway, the connected vehicle, and/or the pedestrian.

* * * * *